(12) United States Patent
Okada

(10) Patent No.: US 7,922,342 B2
(45) Date of Patent: Apr. 12, 2011

(54) ROTATIONAL MEMBER OF PROJECTOR WITH IMPROVED RETENTION

(75) Inventor: Yoshiyuki Okada, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 985 days.

(21) Appl. No.: 11/714,143

(22) Filed: Mar. 6, 2007

(65) Prior Publication Data

US 2007/0211228 A1    Sep. 13, 2007

(30) Foreign Application Priority Data

Mar. 7, 2006  (JP) .................................. 2006-060405

(51) Int. Cl.
*G03B 21/14* (2006.01)
*G05G 1/10* (2006.01)

(52) U.S. Cl. ........................................ 353/101; 74/553

(58) Field of Classification Search .......... 359/699–701; 403/348, 349, 353, 352; 74/552, 53, 558, 74/10 R–10 A, 553; 353/119, 122, 101, 102
See application file for complete search history.

(56) References Cited

U.S. PATENT DOCUMENTS

| 5,035,528 A | 7/1991 | Thau |
| 5,469,758 A | 11/1995 | Howie, Jr. |
| 2005/0264771 A1* | 12/2005 | Itou ............................... 353/101 |
| 2006/0066822 A1* | 3/2006 | Salvatori et al. .............. 353/102 |

FOREIGN PATENT DOCUMENTS

| GB | 2 319 058 A | 5/1998 |
| JP | 8-15774 A | 1/1996 |
| JP | 2000-161345 A | 6/2000 |
| JP | 2002-40556 A | 2/2002 |
| JP | 2002-214698 A | 7/2002 |

OTHER PUBLICATIONS

European Search Report dated Jul. 17, 2007 (four (4) pages).
Japanese Office Action dated Sep. 4, 2009 with English translation (thirteen (13) pages).

* cited by examiner

*Primary Examiner* — Thanh X Luu
*Assistant Examiner* — Danell L Owens
(74) *Attorney, Agent, or Firm* — Crowell & Moring LLP

(57) ABSTRACT

A rotational member inhibitable from coming off a support member is obtained. This rotational member includes a rotational portion rotatably mounted on a support member, a pair of arcuate portions provided on a side of the rotational portion closer to the support member to extend from the rotational portion and opposed to each other and a hook portion so provided as to extend from a circumferential end of at least one of the pair of arcuate portions in an outward direction intersecting with a mounting direction for the rotational portion for engaging with the support member.

9 Claims, 8 Drawing Sheets

ROTATIONAL MEMBER OF PROJECTOR WITH IMPROVED RETENTION

BACKGROUND OF THE INVENTION

1. Field of the Invention

The present invention relates to a rotational member rotatably mounted on an electronic apparatus including a projector or the like.

2. Description of the Background Art

An electronic apparatus such as a projector rotatably mounted with a rotational member for adjusting the apparatus or the like is known in general, as disclosed in Japanese Patent Laying-Open No. 8-15774 (1996), 2002-40556 or 2002-214698, for example. Further, a rotational member rotatably mounted on an electronic apparatus such as a projector and a holder for such a rotational member are proposed in general, as disclosed in Japanese Patent Laying-Open No. 2000-161345, for example.

FIG. 14 is a perspective view showing the structure of a conventional rotational member 103 disclosed in the aforementioned Japanese Patent Laying-Open No. 2000-161345. As shown in FIG. 14, the conventional rotational member 103 disclosed in Japanese Patent Laying-Open No. 2000-161345 is mounted by a holder 101 formed by an elastically deformable wire. The holder 101 is fixed to a fixing member 102 provided with a mounting groove 102a. This holder 101, constituted of the wire substantially bent into a pentagonal form, is provided with an opening 101a on the forward end thereof. This opening 101a is so formed that the width W thereof is smaller than the diameter of a sliding groove 103a of the rotational member 103 received therein.

The rotational member 103 according to the aforementioned Japanese Patent Laying-Open No. 2000-161345 is inserted into the mounting groove 102a of the fixing member 102 along arrow G, so that the sliding groove 103a thereof comes into contact with the opening 101a of the holder 101. When the rotational member 103 comes into contact with the opening 101a of the holder 101, the opening 101a is elastically deformed and widened. When the rotational member 103 is thereafter inserted into the holder 101 beyond the opening 101a, the opening 101a is further elastically deformed and restored to the original shape having the width W smaller than the diameter of the sliding groove 103a of the rotational member 103. Thus, the rotational member 103 is slidably held in the mounting groove 102a of the fixing member 102 through the inner wall of the sliding groove 102a and the holder 101.

However, the rotational member 103 according to the aforementioned Japanese Patent Laying-Open No. 2000-161345 is held by the elastically deformable holder 101. If force acts on the rotational member 103 oppositely to the mounting direction (along arrow G), therefore, the rotational member 103 disadvantageously easily comes off the mounting groove 102a of the fixing member 102.

SUMMARY OF THE INVENTION

The present invention has been proposed in order to solve the aforementioned problem, and an object of the present invention is to provide a rotational member inhibitable from coming off a support member, a rotational member of a projector and a projector comprising a rotational member.

In order to attain the aforementioned object, a rotational member according to a first aspect of the present invention comprises a rotational portion rotatably mounted on a support member, a pair of arcuate portions provided on a side of the rotational portion closer to the support member to extend from the rotational portion and opposed to each other and a hook portion so provided as to extend from a circumferential end of at least one of the pair of arcuate portions in an outward direction intersecting with a mounting direction for the rotational portion for engaging with the support member.

As hereinabove described, the rotational member according to the first aspect of the present invention is provided with the hook portion so provided as to extend from the circumferential end of either arcuate portion in the outward direction intersecting with the mounting direction for the rotational portion for engaging with the support member so that force hardly acts on the hook portion in a direction causing disengagement thereof (direction intersecting with the mounting direction for the rotational portion) upon application of large force in a direction opposite to the mounting direction for the rotational portion when the rotational portion is mounted on the support member, whereby the rotational portion can be inhibited from coming off the support member. Further, the hook portion provided on the end of either arcuate portion can easily disengage from the support member due to the deformability of the arcuate portion when force is applied to the hook portion in the central direction of the arcuate portion (direction intersecting with the mounting direction for the rotational portion) for dismounting the rotational portion from a mounting hole.

In the aforementioned rotational member according to the first aspect, the hook portion preferably engages with an engaging portion located outside a mounting hole of the support member, and a contact portion having a function of deflecting the hook portion inside the mounting hole by coming into contact with the mounting hole of the support member upon mounting of the hook portion is preferably provided on the forward end of the hook portion in the mounting direction with respect to the mounting hole of the support member. According to this structure, the hook portion, deflected inside the mounting hole when received therein, can be inserted into the mounting hole by applying force thereto only in the mounting direction. After received in the mounting hole, the hook portion is released from the mounting hole and restored to the original shape protruding outward beyond the mounting hole, for engaging with the engaging portion located outside the mounting hole and implementing a mounted state. In other words, the rotational portion can be mounted on the support member by applying force thereto only in the mounting direction, whereby workability for mounting the rotational portion on the support member can be improved.

In this case, the arcuate portions are preferably arranged in the vicinity of the inner part of an edge of the mounting hole as viewed from the mounting direction. According to this structure, the hook portion can engage with the support member even if the same extends outward from either arcuate portion by only a small quantity. Thus, the hook portion can be inhibited from reduction in mechanical strength resulting from excessive extension from either arcuate portion.

In the aforementioned structure provided with the hook portion including the contact portion having the function of deflecting the hook portion inside the mounting hole, the contact portion preferably includes an inclined surface gradually inclined into the mounting hole toward the mounting direction for the rotational portion. According to this structure, the inclined surface is so pressed against an edge of the mounting hole that the hook portion can be pressed into the mounting hole when the rotational portion is inserted into the mounting hole. Thus, the hook portion can be easily deflected inside the mounting hole. The inclined surface may be either flatly or curvedly formed.

In this case, an end of the inclined surface in the mounting direction is preferably arranged inside the mounting hole and another end of the inclined surface in a direction opposite to the mounting direction is preferably arranged outside the mounting hole as viewed from the mounting direction. According to this structure, the inclined surface reliably comes into contact with the edge of the mounting hole when the rotational portion is mounted on the support member, whereby the hook portion can be reliably deflected inside the mounting hole.

In the aforementioned rotational member according to the first aspect, the hook portions are preferably provided one by one on both circumferential ends of both of the pair of arcuate portions. According to this structure, force uniformly acts on the four hook portions in total in the mounted state, whereby the rotational member can be prevented from backlash or the like.

In the aforementioned rotational member according to the first aspect, the rotational portion is preferably rotated in a state supported by a support portion of the support member, and a cylindrical guide portion fittingly receiving the support portion is preferably provided on the rotational portion. According to this structure, the guide portion can easily rotatably guide the rotational portion supported by the support portion.

In the aforementioned rotational member according to the first aspect, the hook portion is preferably formed with an engaging groove engaging with an engaging portion located outside a mounting hole of the support member, and the width of the engaging groove is preferably larger than the thickness of the engaging portion of the support member engaging with the engaging groove. According to this structure, the engaging portion of the support member can be so formed as not to come into contact with the engaging groove in the mounted state, whereby the rotational portion can be rotated with small force.

In this case, the engaging groove is preferably so formed as to extend in parallel with the rotational direction of the rotational portion. According to this structure, the engaging portion of the support member can be inhibited from coming into contact with the engaging groove upon rotation of the rotational portion, whereby the rotational portion can be easily rotated.

In the aforementioned structure provided with the hook portion including the contact portion having the function of deflecting the hook portion inside the mounting hole, the rotational member preferably further comprises a reinforcing rib provided on the side of the rotational portion closer to the support member integrally with the rotational portion and the arcuate portions. According to this structure, the arcuate portion provided with the hook portion deflected inside the mounting hole can be reinforced. Thus, the arcuate portion can be inhibited from deformation or breakage resulting from force applied thereto upon deflection of the hook portion.

In the aforementioned rotational member according to the first aspect, the support member may include a frame of a projector, and the rotational member may include a focus control knob for controlling the focus of a projection lens of the projector.

A rotational member of a projector according to a second aspect of the present invention is a rotational member of a projector rotatably supported by a support portion of a support member, comprising a rotational portion provided with a cylindrical guide portion fittingly receiving the support portion and rotatably mounted on the support member, a pair of arcuate portions provided on a side of the rotational portion closer to the support member to extend from the rotational portion and opposed to each other and hook portions provided one by one on both circumferential ends of both of the pair of arcuate portions to extend in an outward direction intersecting with a mounting direction for the rotational portion for engaging with the support member, while contact portions having functions of deflecting the hook portions inside a mounting hole of the support member by coming into contact with the mounting hole of the support member upon mounting of the hook portions are provided on the forward ends of the hook portions in the mounting direction with respect to the mounting hole of the support member, and the hook portions are formed with engaging grooves, engaging with an engaging portion located outside the mounting hole of the support member, having a width larger than the thickness of the engaging portion of the support member.

As hereinabove described, the rotational member of a projector according to the second aspect of the present invention is provided with the hook portions so provided as to extend from the circumferential ends of the arcuate portions in the outward direction intersecting with the mounting direction for the rotational portion for engaging with the support member so that force hardly acts on the hook portions in a direction causing disengagement thereof (direction intersecting with the mounting direction for the rotational portion) upon application of large force in a direction opposite to the mounting direction for the rotational portion when the rotational portion is mounted on the support member, whereby the rotational portion can be inhibited from coming off the support member. Further, the hook portions provided on the ends of the arcuate portions can easily disengage from the support member due to deformability of the arcuate portions when force is applied to the hook portions in the central direction of the arcuate portions (direction intersecting with the mounting direction for the rotational portion) for dismounting the rotational portion from a mounting hole.

According to the second aspect, further, the contact portions having the functions of deflecting the hook portions inside the mounting hole by coming into contact with the mounting hole of the support member upon mounting of the hook portions are provided on the forward ends of the hook portions in the mounting direction with respect to the support member, so that the hook portions are deflected inside the mounting hole when received therein. Thus, the hook portions can be inserted into the mounting hole by applying force thereto only in the mounting direction. After received in the mounting hole, the hook portions are released from the mounting hole and restored to the original shape protruding outward beyond the mounting hole, for engaging with the engaging portion located outside the mounting hole and implementing a mounted state. In other words, the rotational portion can be mounted on the support member by applying force thereto only in the mounting direction, whereby workability for mounting the rotational portion on the support member can be improved. In addition, the hook portions are provided one by one on both circumferential ends of both of the pair of arcuate portions so that force uniformly acts on the four hook portions in total in the mounted state, whereby the rotational member can be prevented from backlash or the like. Further, the cylindrical guide portion provided on the rotational portion for fittingly receiving the support portion can easily rotatably guide the rotational portion supported by the support portion. Further, the hook portions have the width larger than the thickness of the engaging portion of the support member engaging with the engaging grooves so that the engaging portion of the support member can be so formed as not to come into contact with the engaging grooves in the mounted state, whereby the rotational portion can be rotated with small force.

In the aforementioned rotational member of a projector according to the second aspect, the arcuate portions are preferably arranged in the vicinity of the inner part of an edge of the mounting hole as viewed from the mounting direction. According to this structure, the hook portions can engage with the support member even if the same extend outward from the arcuate portions by only a small quantity. Thus, the hook portions can be inhibited from reduction in mechanical strength resulting from excessive extension from the arcuate portions.

In the aforementioned rotational member of a projector according to the second aspect, the contact portions preferably include inclined surfaces gradually inclined into the mounting hole toward the mounting direction for the rotational portion. According to this structure, the inclined surfaces are so pressed against an edge of the mounting hole that the hook portions can be pressed into the mounting hole when the rotational portion is inserted into the mounting hole. Thus, the hook portions can be easily deflected inside the mounting hole. The inclined surfaces may be either flatly or curvedly formed.

In this case, ends of the inclined surfaces in the mounting direction are preferably arranged inside the mounting hole and other ends of the inclined surfaces in a direction opposite to the mounting direction are preferably arranged outside the mounting hole as viewed from the mounting direction. According to this structure, the inclined surfaces reliably come into contact with the edge of the mounting hole when the rotational portion is mounted on the support member, whereby the hook portions can be reliably deflected inside the mounting hole.

In the aforementioned rotational member of a projector according to the second aspect, the engaging grooves are preferably so formed as to extend in parallel with the rotational direction of the rotational portion. According to this structure, the engaging portion of the support member can be inhibited from coming into contact with the engaging grooves upon rotation of the rotational portion, whereby the rotational portion can be easily rotated.

The aforementioned rotational member of a projector according to the second aspect preferably further comprises a reinforcing rib provided on the side of the rotational portion closer to the support member integrally with the rotational portion and the arcuate portions. According to this structure, the arcuate portions provided with the hook portions deflected inside the mounting hole can be reinforced. Thus, the arcuate portions can be inhibited from deformation or breakage resulting from force applied thereto upon deflection of the hook portions.

In the aforementioned rotational member of a projector according to the second aspect, the support member may include a frame of the projector, and the rotational member may include a focus control knob for controlling the focus of a projection lens of the projector.

A projector according to a third aspect of the present invention comprises a frame, a projection lens mounted on the frame for projecting images and a rotational member for controlling the focus of the projection lens, while the rotational member includes a rotational portion rotatably mounted on the frame, a pair of arcuate portions provided on a side of the rotational member closer to the frame to extend from the rotational portion and opposed to each other and a hook portion so provided as to extend from a circumferential end of at least one of the pair of arcuate portions in an outward direction intersecting with a mounting direction for the rotational portion for engaging with the frame.

As hereinabove described, the projector according to the third aspect of the present invention is provided with the hook portion so provided as to extend from the circumferential end of either arcuate portion in the outward direction intersecting with the mounting direction for the rotational portion for engaging with the frame so that force hardly acts on the hook portion in a direction causing disengagement thereof (direction intersecting with the mounting direction for the rotational portion) upon application of large force in a direction opposite to the mounting direction for the rotational portion when the rotational portion is mounted on the frame, whereby the rotational portion can be inhibited from coming off the frame. Further, the hook portion provided on the end of either arcuate portion can easily disengage from the frame due to deformability of the arcuate portion when force is applied to the hook portion in the central direction of the arcuate portion (direction intersecting with the mounting direction for the rotational portion) for dismounting the rotational portion from a mounting hole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings. In the following description, the present invention is applied to a focus control knob 6 of a projector.

First, the structure of the projector to which the focus control knob 6 according to the embodiment of the present invention is applied is described with reference to FIGS. 1 to 3.

Figure 1:
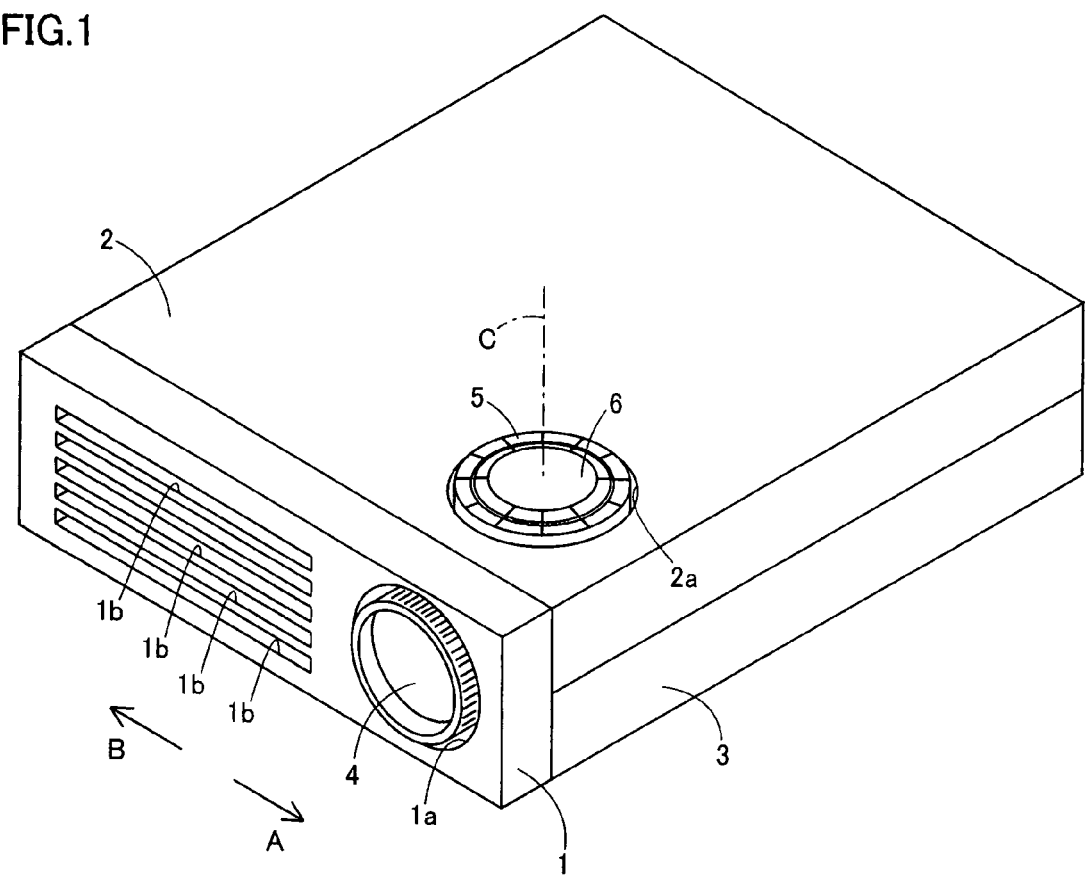
FIG. 1 is a perspective view showing the overall structure of a projector according to an embodiment of the present invention.

According to the present invention, a frame of the projector includes a front frame 1, an upper frame 2 and a lower frame 3, as shown in FIG. 1. A lens receiving portion 1a receiving a projection lens 4 for projecting images is formed on a portion of the front frame 1 closer to a first end (along arrow A). A plurality of exhaust ports 1b for discharging cooling air are formed on another portion of the front frame 1 closer to a second end (along arrow B). The upper frame 2 is an example of the "support member" or the "frame" in the present invention.

Figure 2:
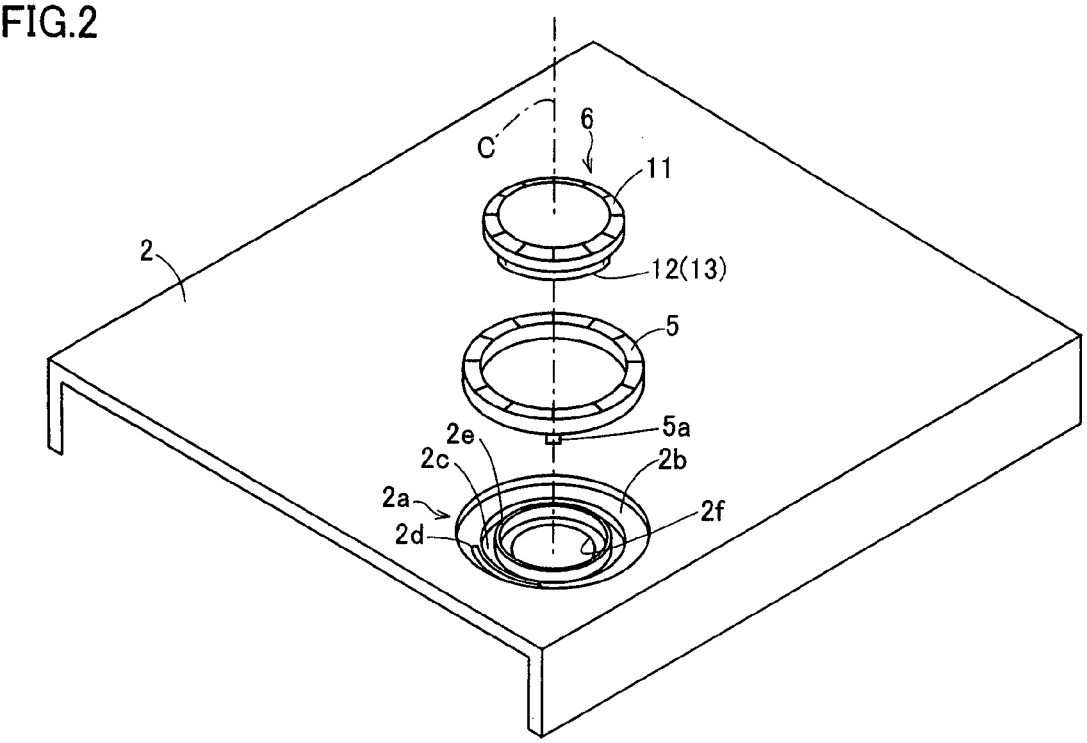
FIG. 2 is an exploded perspective view showing an upper case, a zoom control knob and a focus control knob of the projector according to the embodiment of the present invention.

A ringlike zoom control knob 5 for controlling the magnification of the projection lens 4 and the discoidal focus control knob 6 for controlling the focus of the projection lens 4 are mounted on the front portion of the first end of the upper frame 2, as shown in FIG. 2. A recess portion 2a is formed on the portion of the upper frame 2 mounted with the zoom control knob 5 and the focus control knob 6, as shown in FIG. 2. This recess portion 2a includes an upper recess portion 2b and a lower recess portion 2c provided downward and inward beyond the upper recess portion 2b. The focus control knob 6 and the lower recess portion 2c are examples of the "rotational member" and the "engaging portion" in the present invention respectively.

Figure 3:
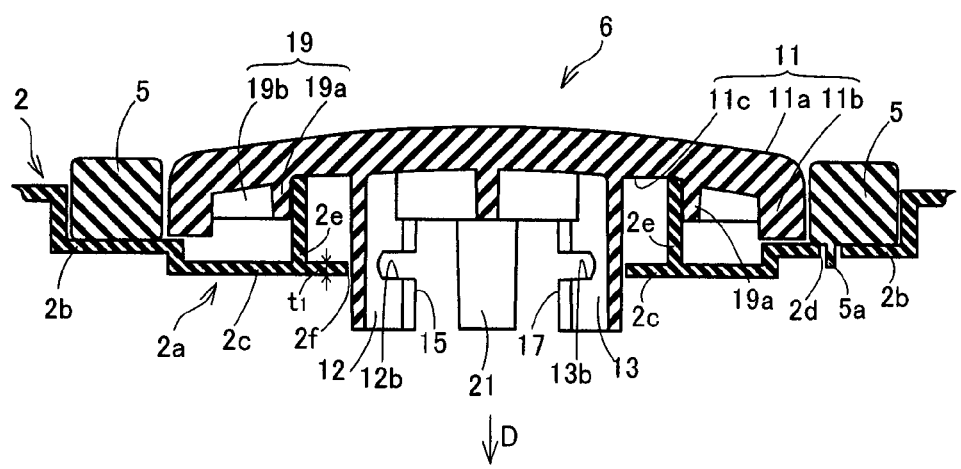
FIG. 3 is a sectional view of a mounting portion for the zoom control knob and the focus control knob of the projector shown in FIG. 1.

As shown in FIG. 3, the upper recess portion 2b is so formed as to slidably support the bottom surface of the zoom control knob 5. The upper recess portion 2b is partially provided with an arcuate guide groove 2d formed in a prescribed angular range in the circumferential direction for engaging with an engaging projection 5a of the zoom control knob 5.

As shown in FIG. 2, the lower recess portion 2c is provided with a cylindrical boss 2e rotatably fitted into a cylindrical guide rib portion 19a of the focus control knob 6. The outer side surface of the upper end of this boss 2e slidably comes into contact with the inner side surface of the guide rib portion 19a of the focus control knob 6 as shown in FIG. 3, while the upper end surface of the boss 2e is slidably in contact with a lower surface portion 11c of the focus control knob 6. A mounting hole 2f receiving the forward ends of a pair of arcuate portions 12 and 13 of the focus control knob 6 and hook portions 14 to 17 as described later is formed on the center of the lower recess portion 2c. The boss 2e is an example of the "support portion" in the present invention.

The zoom control knob 5, rotatable about an axis C of rotation, is so mounted as to enclose the outer periphery of the focus control knob 6, as shown in FIG. 1. The downwardly extending engaging projection 5a is formed on the bottom surface of the zoom control knob 5, as shown in FIG. 3. The engaging projection 5a engages with the guide groove 2d formed on the upper recess portion 2b of the upper frame 2, to be rotated in a prescribed angular range along the guide groove 2d. This engaging projection 5a engages with a zoom mechanism (not shown) having gears etc. for controlling the magnification of the projection lens 4.

The structure of the focus control knob 6 according to the embodiment of the present invention is now described with reference to FIGS. 1 to 9.

As shown in FIGS. 1 and 2, the focus control knob 6 is mounted on the recess portion 2a of the upper frame 2 to be rotatable about the axis C of rotation (see FIG. 2). This focus control knob 6 is constituted of ABS resin (acrylonitrile butadiene styrene resin). As shown in FIGS. 4 to 7, a knob portion 11, the pair of arcuate portions 12 and 13, the hook portions 14, 15, 16 and 17, an inner rib 18, an outer rib 19 and a pair of engaging projections 20 and 21 are integrally formed on the focus control knob 6. The knob portion 11 is an example of the "rotational portion" in the present invention.

Figure 7:
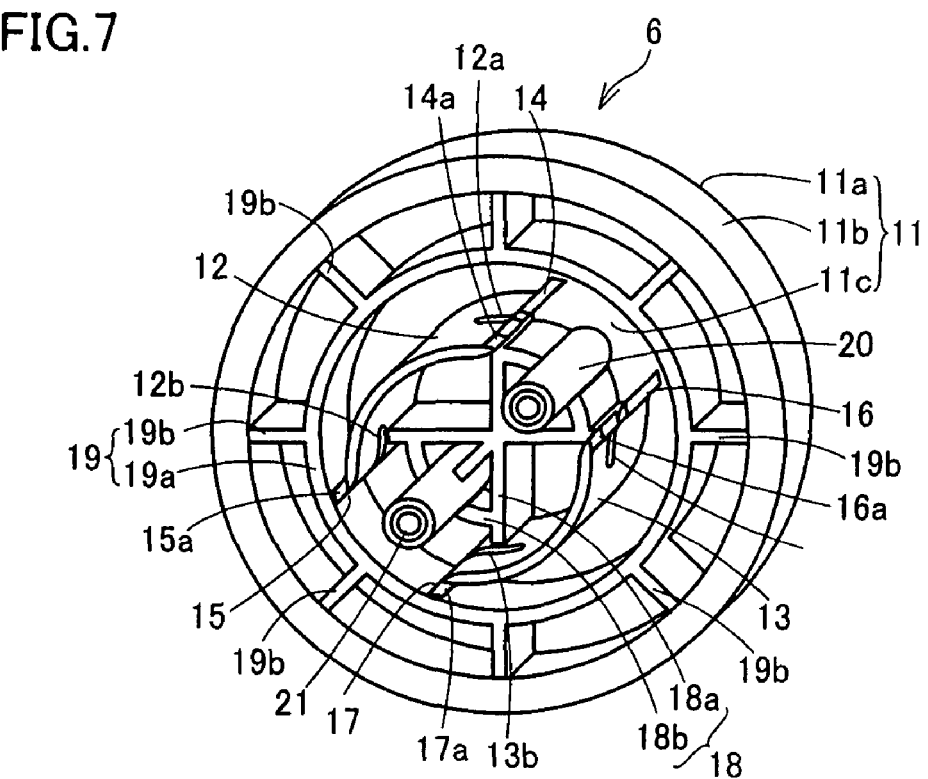
FIG. 7 is a perspective view of the focus control knob as viewed from the bottom surface.

As shown in FIG. 3, the knob portion 11 includes an upper surface portion 11a, an outer peripheral portion 11b formed on the outer periphery of the upper surface portion 11a and the lower surface portion 11c. When the focus control knob 6 is mounted on the projector as shown in FIG. 1, the upper surface portion 11a of the knob portion 11 is exposed from the upper surface of the upper frame 2 so that the user can rotate the knob portion 11 about the axis C of rotation. The outer peripheral portion 11b of the knob portion 11 extends downward from the outer periphery of the upper surface portion 11a. The pair of arcuate portions 12 and 13, the inner rib 18, the outer rib 19 and the pair of engaging projections 20 and 21 are integrally provided on the lower surface portion 11c of the knob portion 11, as shown in FIGS. 4 and 7.

Figure 4:
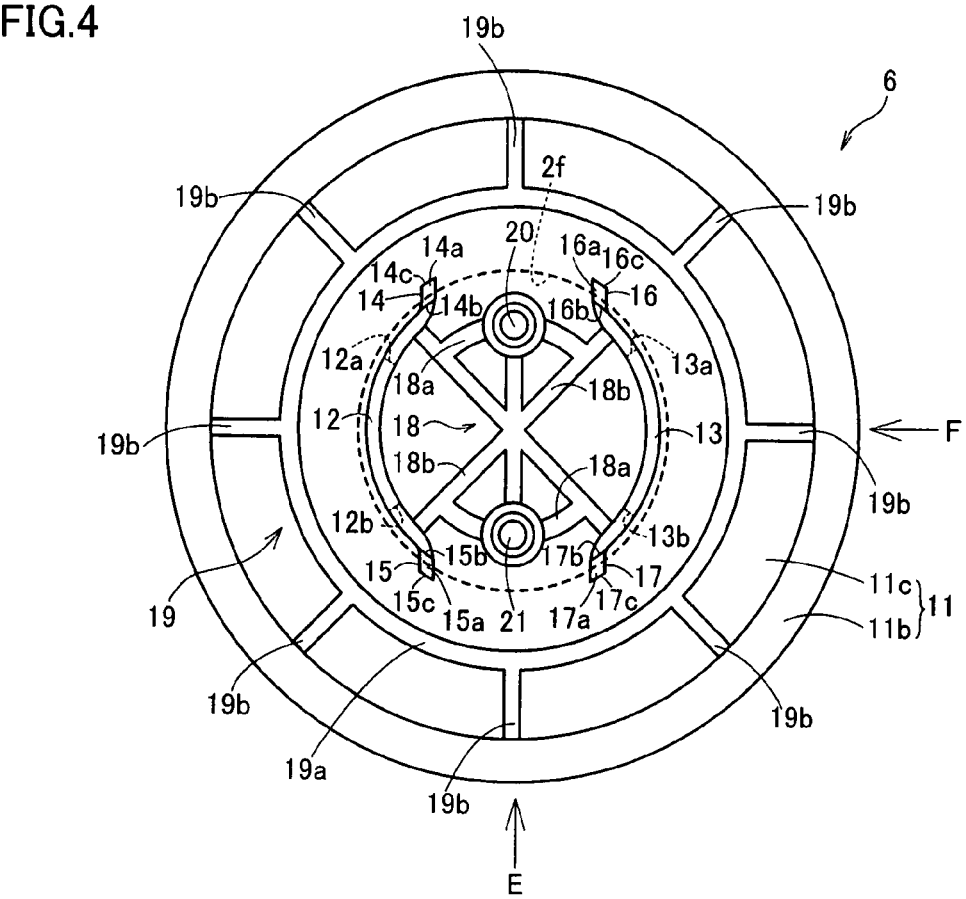
FIG. 4 is a bottom plan view of the focus control knob of the projector according to the embodiment of the present invention.
Figure 5:
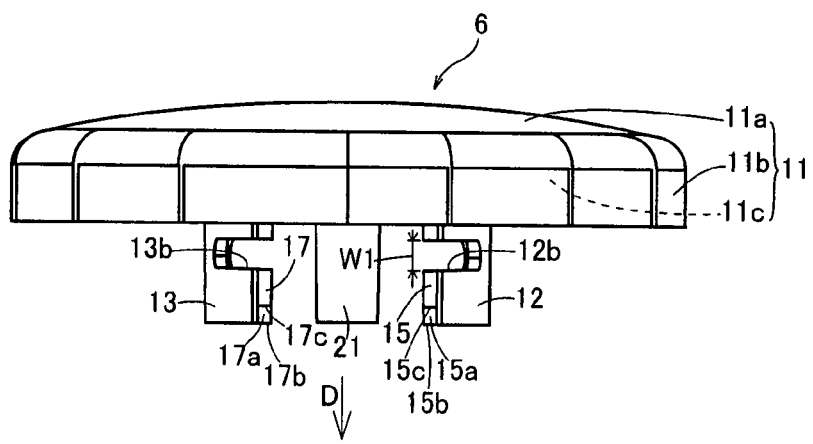
FIG. 5 is a side elevational view of the focus control knob vertically inverted as viewed along arrow E in FIG. 4.
Figure 8:
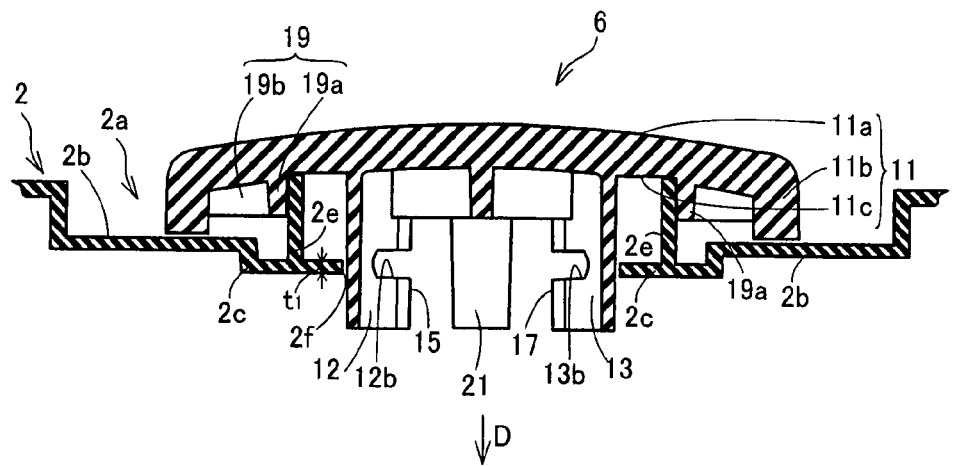
FIG. 8 is a sectional view showing the focus control knob mounted on the upper case.
Figure 9:
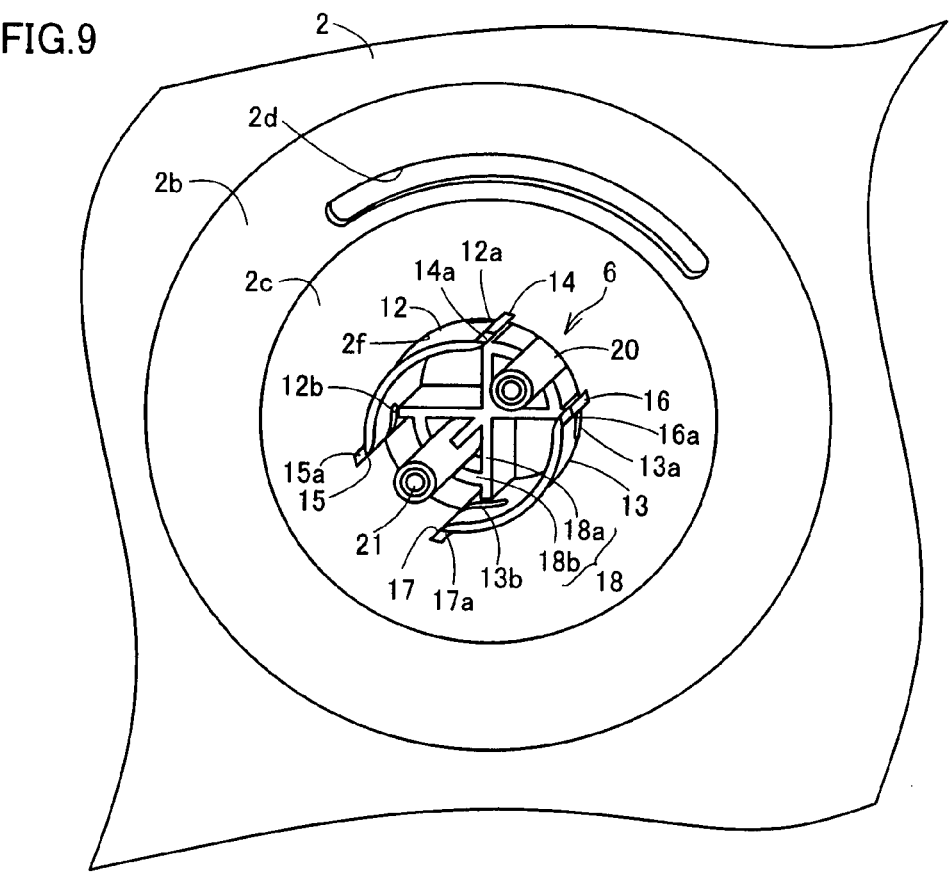
FIG. 9 is a perspective view showing the focus control knob mounted on the upper case as viewed from the bottom surface.

The pair of arcuate portions 12 and 13 are opposed to each other through the center of the focus control knob 6, as shown in FIG. 4. Further, the arcuate portions 12 and 13 are so integrally provided on the lower surface portion 11c that the lower surfaces thereof protrude downward beyond the lower surface of the outer peripheral portion 11b of the knob portion 11, as shown in FIG. 5. These arcuate portions 12 and 13 are smaller in thickness than the knob portion 11 to be elastically deformable, as shown in FIG. 7. In addition, the pair of arcuate portions 12 and 13 are arranged in the vicinity of the inner side of an edge of the mounting hole 2f as viewed from a mounting direction (along arrow D in FIG. 8) for the focus control knob 6, as shown in FIGS. 8 and 9.

Figure 6:
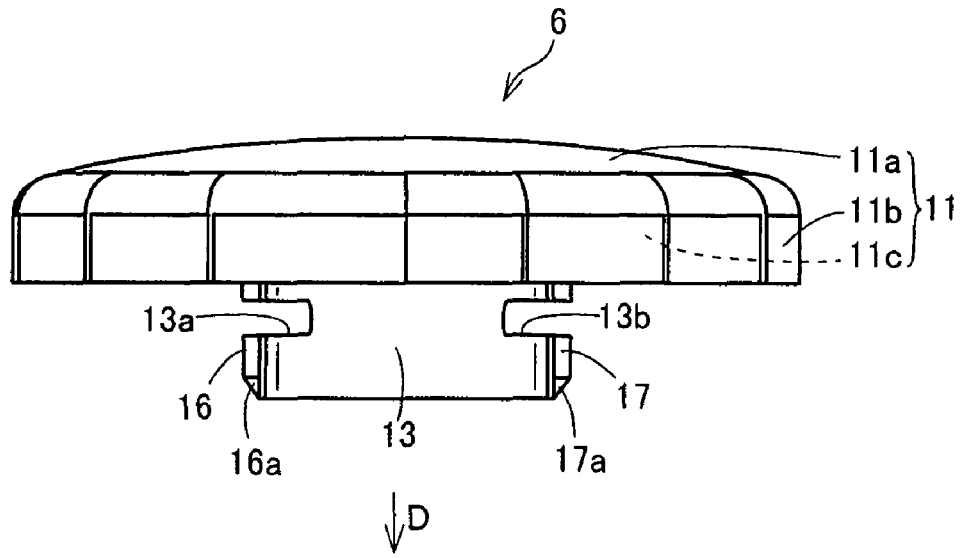
FIG. 6 is a side elevational view of the focus control knob vertically inverted as viewed along arrow F in FIG. 4.

According to this embodiment, the four hook portions 14 to 17 extend outward from both ends of both of the arcuate portions 12 and 13 respectively. These hook portions 14 to 17 are so formed as to partially protrude outward beyond the mounting hole 2f of the upper frame 2 in the mounted state, as shown in FIG. 9. Chamfered contact portions 14a, 15a, 16a and 17a inclined toward the knob portion 11 are formed on the forward ends of the hook portions 14 to 17 in the mounting direction (along arrow D in FIG. 6), as shown in FIG. 6. The inclined surfaces of the contact portions 14a to 17a are gradually inclined toward the inner side of the mounting hole 2f in the mounting direction (along arrow D) for the focus control knob 6, as shown in FIG. 6. First ends 14b, 15b, 16b and 17b of the inclined surfaces along the mounting direction (along arrow D in FIG. 5) are arranged inside the mounting hole 2f, while second ends 14c, 15c, 16c and 17c of the inclined surfaces opposite to the mounting direction are arranged outside the mounting hole 2f, as shown in FIGS. 4 and 5. The contact portions 14a, 15a, 16a and 17a have functions of deflecting the hook portions 14 to 17 inside the mounting hole 2f by coming into contact with the mounting hole 2f of the upper frame 2 when the hook portions 14 to 17 are mounted.

Four engaging grooves 12a, 12b, 13a and 13b are formed in the vicinity of the centers of downwardly extending portions of the arcuate portions 12 and 13 and the hook portions 14 to 17, to extend in the circumferential direction of the arcuate portions 12 and 13. The four engaging grooves 12a, 12b, 13a and 13b are so formed as to extend in parallel with the rotational direction of the focus control knob 6. The width $W_1$ (see FIG. 5) of these engaging grooves 12a, 12b, 13a and 13b is larger than the thickness $t_1$ (see FIG. 8) of the lower recess portion 2c of the upper frame 2. When the focus control knob 6 is mounted on the upper frame 2, the boss 2e of the upper frame 2 comes into contact with the lower surface portion 11c of the knob portion 11 to hold the focus control knob 6 as shown in FIG. 8, so that the engaging grooves 12a, 12b, 13a an 13b are not in contact with the lower recess portion 2c of the upper frame 2.

As shown in FIG. 4, the inner rib 18 integrally formed on the lower surface portion 11c includes arcuate rib portions 18a and platelike rib portions 18b radially extending from the center of the focus control knob 6. This inner rib 18 is so formed inside the arcuate portions 12 and 13 that ends thereof are coupled to the arcuate portions 12 and 13 and the engaging projections 20 and 21. The inner rib 18 is so formed that the lower surface thereof is located upward beyond the lower surface of the outer peripheral portion 11b of the knob portion 11, as shown in FIG. 8. The inner rib 18 has a function of reinforcing the arcuate portions 12 and 13 and the engaging projections 20 and 21. The inner rib 18 is an example of the "reinforcing rib" in the present invention.

The outer rib 19 integrally formed on the lower surface portion 11c is located on the outer peripheries of the arcuate portions 12 and 13. This outer rib 19 includes the cylindrical guide rib portion 19a concentric with the focus control knob 6 and a plurality of radial rib portions 19b radially extending from the outer periphery of the guide rib portion 19a toward the outer peripheral portion 11b of the knob portion 11. The outer rib 19 is so formed that the lower surface thereof is located upward beyond the lower surface of the outer peripheral portion 11b of the knob portion 11, as shown in FIG. 8. The guide rib portion 19a is slidably fitted into the outer peripheral surface of the boss 2e of the lower recess portion 2c of the upper frame 2, for serving as a guide upon rotation. The guide rib portion 19a is an example of the "guide portion" in the present invention.

The engaging projections 20 and 21 are arranged on positions opposite to each other through the center of the focus control knob 6, to be held between the arcuate portions 12 and 13. These engaging projections 20 and 21 engage with a focusing mechanism (not shown) having gears etc. for controlling the focus of the projection lens 4.

FIGS. 10 to 13 are side elevational views for illustrating an operation of mounting the focus control knob 6. The operation of mounting the focus control knob 6 is now described with reference to FIGS. 8 and 10 to 13.

Figure 10:
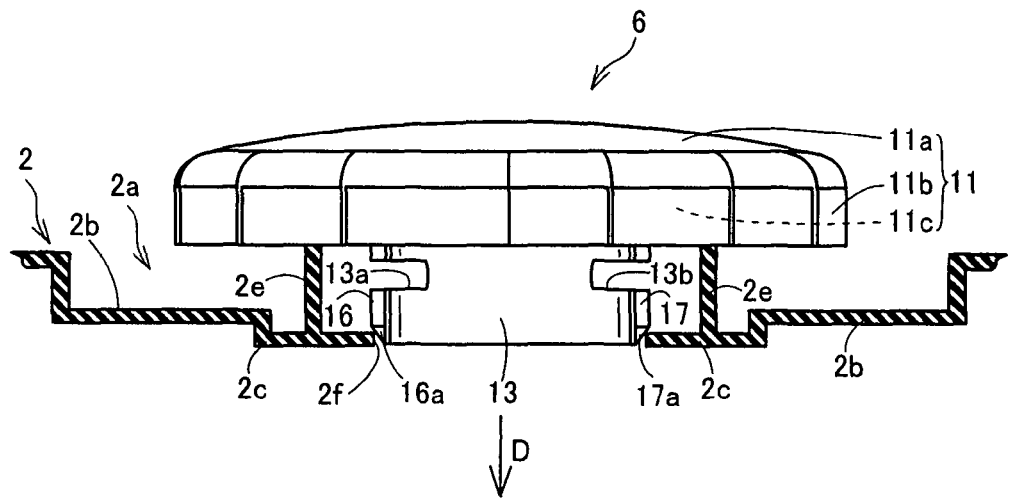
FIGS. 10 to 13 are diagrams of the focus control knob and the upper frame for illustrating an operation of mounting the focus control knob.
Figure 11:
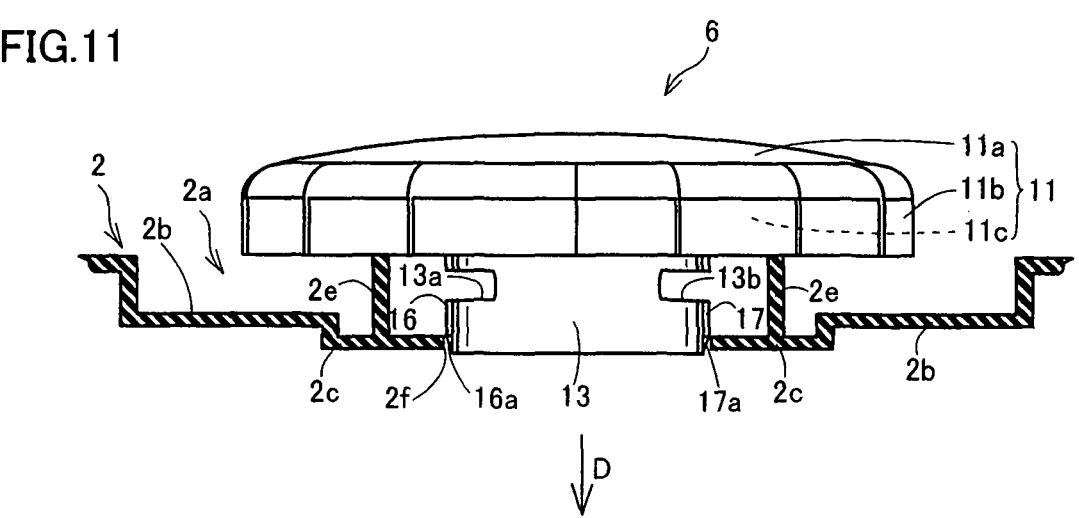
Figure 12:
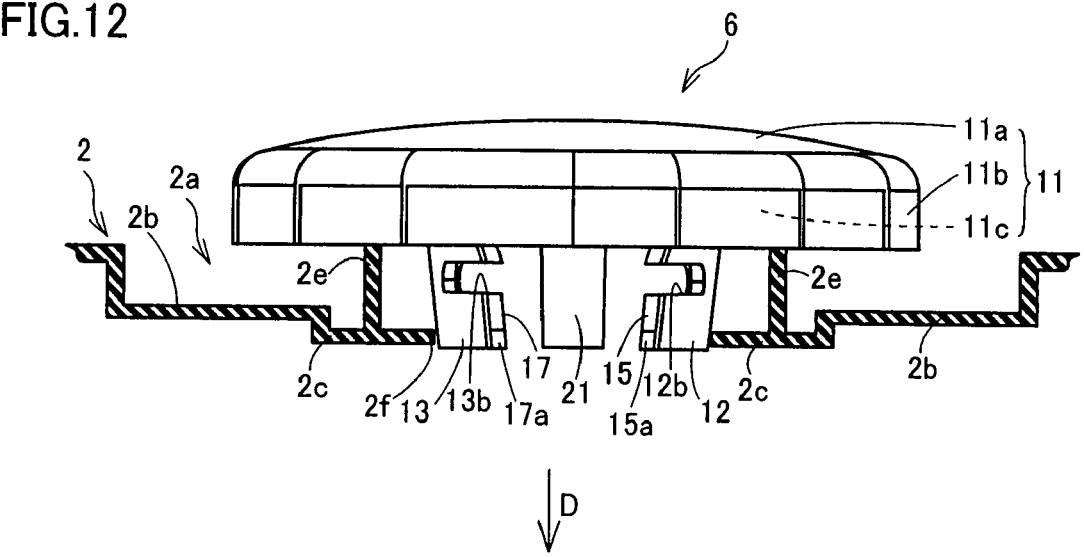
Figure 13:
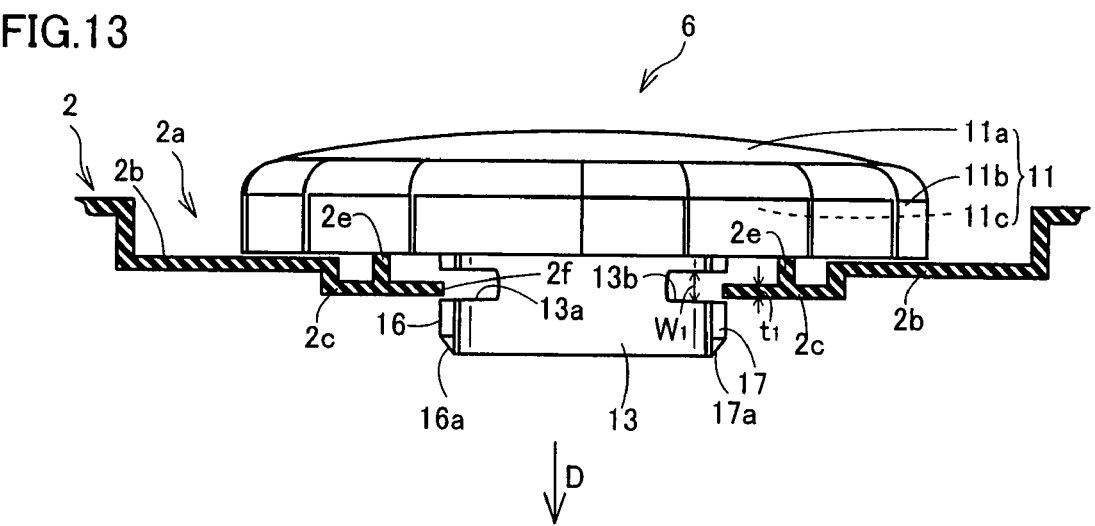
Figure 14:
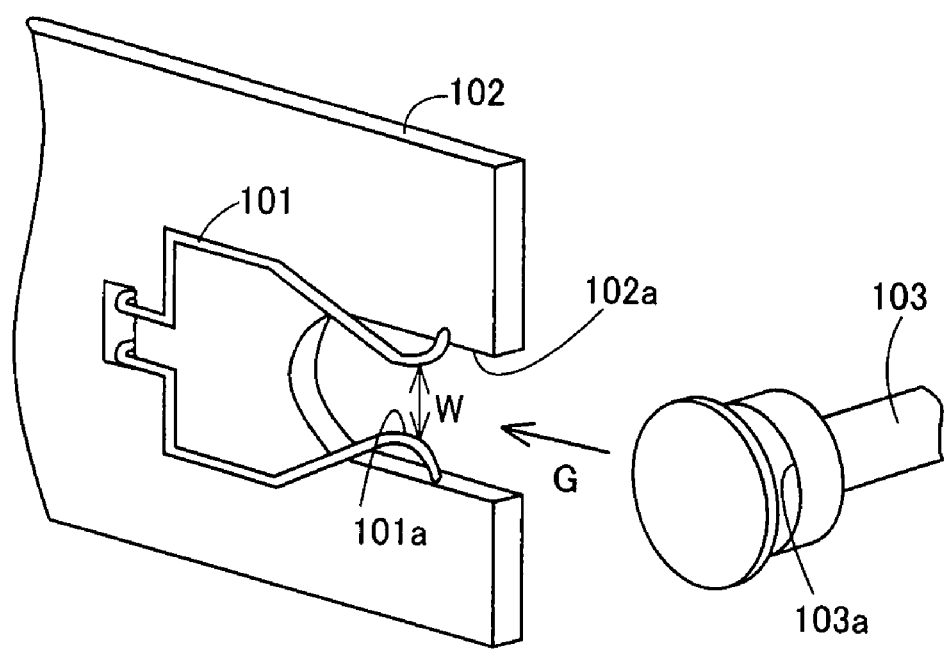
FIG. 14 is a perspective view showing the structure of a conventional rotational member.

As shown in FIG. 10, the focus control knob 6 is inserted into the recess portion 2a until the chamfered contact portions 14a to 17a of the hook portions 14 to 17 come into contact with the inner peripheral surface of the mounting hole 2f of the upper frame 2. Then, force is applied to the focus control knob 6 in the mounting direction (along arrow D) for inserting the same into the mounting hole 2f, so that the chamfered contact portions 14a to 17a of the hook portions 14 to 17 are forced into the mounting hole 2f from the inner peripheral surface thereof, thereby elastically deforming the arcuate portions 12 and 13 inward along with the hook portions 14 to 17. Thus, the hook portions 14 to 17 and the arcuate portions 12 and 13 are receivable in the mounting hole 2f. The focus control knob 6 is further inserted into the mounting hole 2f along arrow D, so that the hook portions 14 to 17 are released from the inner peripheral surface of the mounting hole 2f as shown in FIG. 13. Thus, the arcuate portions 12 and 13 and the hook portions 14 to 17 are restored to the original shapes due to the restoring force of the arcuate portions 12 and 13, so that the hook portions 14 to 17 are partially located outside the mounting hole 2f. Further, the lower recess portion 2c of the upper frame 2 is received in the engaging grooves 12a, 12b, 13a and 13b. In this mounted state, the guide rib portion 19a of the outer rib 19 of the focus control knob 6 is fitted into the boss 2e of the lower recess portion 2c so that the upper end surface of the boss 2e is slidably in contact with the lower surface portion 11c of the focus control knob 6 as shown in FIG. 8 while the lower recess portion 2c of the upper frame 2 inserted into the engaging grooves 12a, 12b, 13a and 13b is not in contact with the inner walls of the engaging grooves 12a, 12b, 13a and 13b having the width $W_1$ larger than the thickness $t_1$ of the lower recess portion 2c, as shown in FIG. 13. In the mounted state, further, a clearance is formed between the arcuate portions 12 and 13 and the mounting hole 2f, so that the inner surfaces of the arcuate portions 12 and 13 and the mounting hole 2f are not in contact with each other.

In order to dismount the focus control knob 6, the hook portions 14 to 17 are pressed toward the central direction of the focus control knob 6, thereby elastically deforming the arcuate portions 12 and 13 so that the same can be discharged from the mounting hole 2f. The elastically deformed arcuate portions 12 and 13 are pulled out oppositely to the mounting direction (along arrow D), thereby dismounting the focus control knob 6.

According to this embodiment, as hereinabove described, the focus control knob 6 is provided with the hook portions 14 to 17 so provided as to extend from the circumferential ends of the arcuate portions 12 and 13 in the outward direction intersecting with the mounting direction (along arrow D) for the focus control knob 6 for engaging with the lower recess portion 2c of the upper frame 2 so that force hardly acts on the hook portions 14 to 17 in a direction causing disengagement thereof (direction intersecting with the mounting direction D for the focus control knob 6) upon application of large force in a direction opposite to the mounting direction (along arrow D) for the focus control knob 6 when the focus control knob 6 is mounted on the lower recess portion 2c, whereby the focus control knob 6 can be inhibited from coming off the mounting hole 2f. Further, the hook portions 14 to 17 provided on the ends of the arcuate portions 12 and 13 can easily disengage from the upper frame 2 when force is applied to the hook portions 14 to 17 in the central direction of the arcuate portions 12 and 13 (direction intersecting with the mounting direction D for the focus control knob 6) for dismounting the focus control knob 6 from the mounting hole 2f.

According to the aforementioned embodiment, the chamfered contact portions 14a to 17a having the functions of deflecting the hook portions 14 to 17 inside the mounting hole 2f by coming into contact with the mounting hole 2f upon mounting of the hook portions 14 to 17 are provided on the forward ends of the hook portions 14 to 17 in the mounting direction (along arrow D) with respect to the lower recess portion 2c, whereby the hook portions 14 to 17 are deflected inside the mounting hole 2f when received therein. Thus, the hook portions 14 to 17 can be inserted into the mounting hole 2f by applying force thereto only in the mounting direction (along arrow D). After received in the mounting hole 2f, the hook portions 14 to 17 are released from the inner wall of the mounting hole 2f and restored to the original shapes partially located outside the mounting hole 2f, for engaging with the lower recess portion 2c located outside the mounting hole 2f and implementing the mounted state. In other words, the focus control knob 6 can be mounted on the upper frame 2 by applying force thereto only in the mounting direction, whereby workability for mounting the focus control knob 6 on the upper frame 2 can be improved.

According to the aforementioned embodiment, the hook portions 14 to 17 are provided one by one on both circumferential ends of both of the pair of arcuate portions 12 and 13 so that force uniformly acts on the four hook portions 14 to 17 in total in the mounted state, whereby the focus control knob 6 can be prevented from backlash or the like. Further, the cylindrical guide rib portion 19a provided on the knob portion 11 for fittingly receiving the boss 2e of the upper frame 2 can easily rotatably guide the focus control knob 6 supported by the boss 2e of the upper frame 2. In addition, the engaging grooves 12a, 12b, 13a and 13b formed on the hook portions 14 to 17 have the width $W_1$ larger than the thickness $t_1$ of the lower recess portion 2c of the upper frame 2 so that the lower recess portion 2c of the upper frame 2 can be so formed as not to come into contact with the engaging grooves 12a, 12b, 13a and 13b in the mounted state, whereby the focus control knob 6 can be rotated with small force.

Although the present invention has been described and illustrated in detail, it is clearly understood that the same is by way of illustration and example only and is not to be taken by way of limitation, the spirit and scope of the present invention being limited only by the terms of the appended claims.

For example, the present invention, applied to the focus control knob 6 of the projector employed as an exemplary rotational member according to the present invention in the aforementioned embodiment, is not restricted to this but may alternatively be applied to another rotational member.

While the chamfered contact portions 14a, 15a, 16a and 17a are provided on the hook portions 14, 15, 16 and 17 in the aforementioned embodiment, the present invention is not restricted to this but round contact portions having the same functions as the chamfered contact portions 14a, 15a, 16a and 17a may alternatively be provided on the hook portions 14, 15, 16 and 17 in place of the chamfered contact portions 14a, 15a, 16a and 17a.

While the pairs of hook portions 14 to 17 are provided on the pair of arcuate portions 12 and 13 respectively in the aforementioned embodiment, the present invention is not restricted to this but a pair of hook portions may alternatively be provided only either the arcuate portion 12 or the arcuate portion 13, or single hook portions may be provided on both arcuate portions 12 and 13 respectively.

What is claimed is:

1. A rotational member comprising:
   a rotational portion rotatably mounted on a support member;
   a pair of arcuate portions provided on a side of said rotational portion closer to said support member to extend from said rotational portion and opposed to each other; and
   a hook portion so provided as to extend from a circumferential end of at least one of said pair of arcuate portions in an outward direction intersecting with a mounting direction for said rotational portion for engaging with said support member;
   wherein
      said hook portion is formed with an engaging groove engaging with an engaging portion located outside a mounting hole of said support member, and
      the width of said engaging groove is larger than the thickness of said engaging portion of said support member engaging with said engaging groove.

2. The rotational member according to claim 1, wherein said engaging groove is so formed as to extend in parallel with the rotational direction of said rotational portion.

3. A rotational member of a projector rotatably supported by a support portion of a support member, comprising:
   a rotational portion provided with a cylindrical guide portion fittingly receiving said support portion and rotatably mounted on said support member;
   a pair of arcuate portions provided on a side of said rotational portion closer to said support member to extend from said rotational portion and opposed to each other; and
   hook portions provided one by one on both circumferential ends of both of said pair of arcuate portions to extend in an outward direction intersecting with a mounting direction for said rotational portion for engaging with said support member, wherein
   contact portions having functions of deflecting said hook portions inside a mounting hole of said support member by coming into contact with said mounting hole of said support member upon mounting of said hook portions are provided on the forward ends of said hook portions in said mounting direction with respect to said mounting hole of said support member, and said hook portions are formed with engaging grooves, engaging with an engaging portion located outside said mounting hole of said support member, having a width larger than the thickness of said engaging portion of said support member.

4. The rotational member of a projector according to claim 3, wherein
   said arcuate portions are arranged in the vicinity of the inner part of an edge of said mounting hole as viewed from said mounting direction.

5. The rotational member of a projector according to claim 3, wherein
   said contact portions include inclined surfaces gradually inclined into said mounting hole toward said mounting direction for said rotational portion.

6. The rotational member of a projector according to claim 5, wherein
   ends of said inclined surfaces in said mounting direction are arranged inside said mounting hole and other ends of said inclined surfaces in a direction opposite to said mounting direction are arranged outside said mounting hole as viewed from said mounting direction.

7. The rotational member of a projector according to claim 3, wherein
   said engaging grooves are so formed as to extend in parallel with the rotational direction of said rotational portion.

8. The rotational member of a projector according to claim 3, further comprising a reinforcing rib provided on said side of said rotational portion closer to said support member integrally with said rotational portion and said arcuate portions.

9. The rotational member of a projector according to claim 3, wherein
   said support member includes a frame of said projector, and
   said rotational member includes a focus control knob for controlling the focus of a projection lens of said projector.

* * * * *